Sept. 20, 1971　　　THOMAS O. PAINE　　　3,606,212
ADMINISTRATOR OF THE NATIONAL AERONAUTICS
AND SPACE ADMINISTRATION
EMERGENCY EARTH ORBITAL ESCAPE DEVICE
Filed Feb. 2, 1970　　　　　　　　　　　　　3 Sheets-Sheet 3

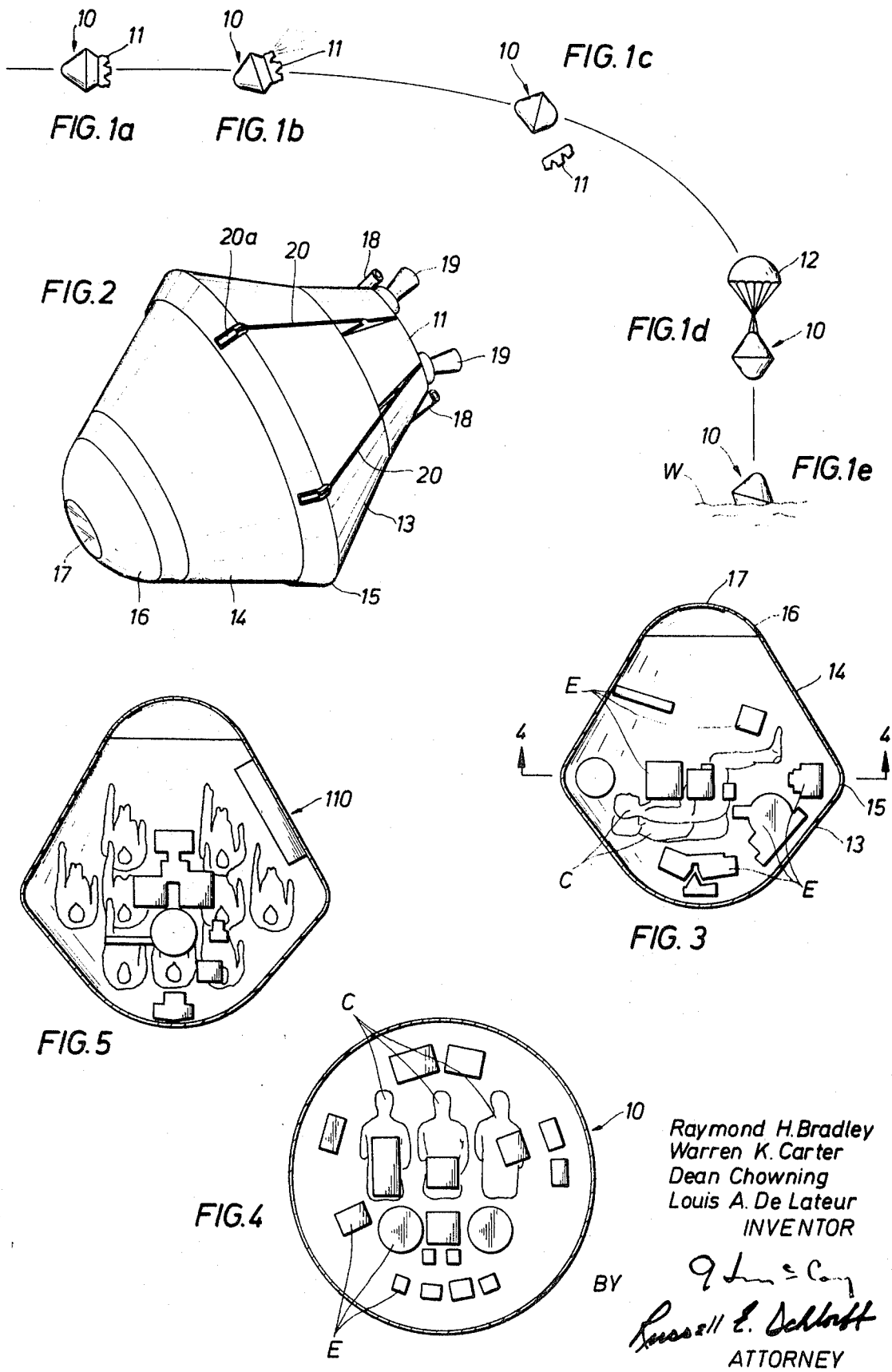

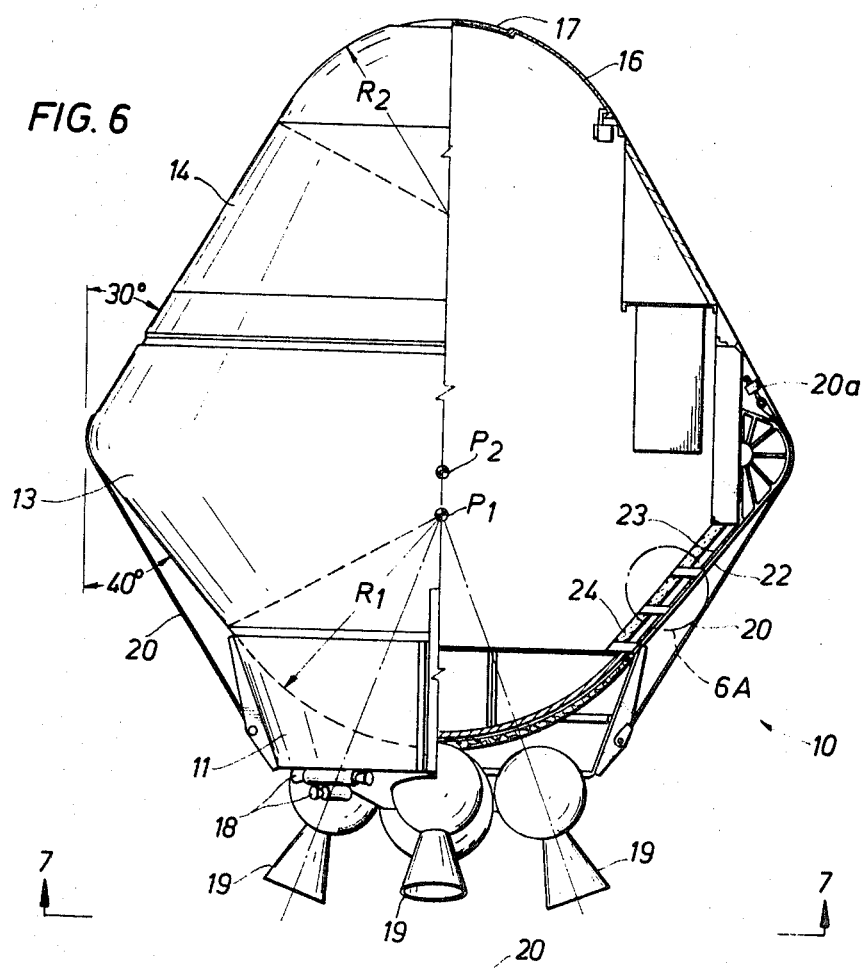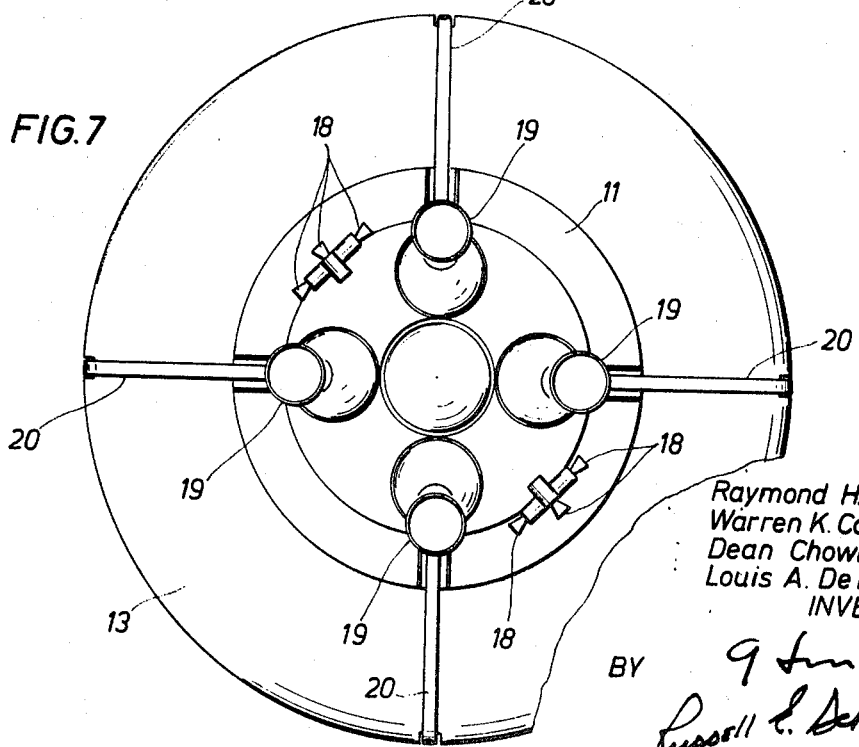

Raymond H. Bradley
Warren K. Carter
Dean Chowning
Louis A. De Lateur
INVENTORS

ATTORNEY

United States Patent Office 3,606,212
Patented Sept. 20, 1971

3,606,212
EMERGENCY EARTH ORBITAL ESCAPE DEVICE
Thomas O. Paine, Administrator of the National Aeronautics and Space Administration, with respect to an invention by Raymond H. Bradley, Houston, Tex., and Warren K. Carter, Santa Cruiz, Louis A. De Lateur, San Jose, and Dean Chowing, Sunnyvale, Calif.
Filed Feb. 2, 1970, Ser. No. 7,669
Int. Cl. B64g 1/00
U.S. Cl. 244—15.5
11 Claims

ABSTRACT OF THE DISCLOSURE

A space vehicle constructed from dissimilar right angle conical sections mated along their bases and having their apexes truncated and spherically rounded to provide the unique property of single point aerodynamic and hydrodynamic stability. A 40° half-angle cone section forms the forward end of the vehicle and is covered with a heat shield of ablative material to dissipate heat generated upon reentry into the Earth's atmosphere. A 30° half-angle cone forms the aft section and includes an entry hatch and window. A separable module secured to the leading end carries control thrusters and retrorocket motors for orienting the vehicle and decelerating it out of orbit toward the Earth. Passive power and life support systems are employed to increase storage life and reaction time of the vehicle. The relative position of the vehicle's center of gravity, center of aerodynamic pressure and hydrodynamic metacenter resulting from the configuration of the two conical sections render the craft stable in the correct position of heat shield leading during free fall through the atmosphere and with the aft end above the water when floating. This single point aerodynamic and hydrodynamic stability is accomplished without resorting to the use of outriggers, balloons, or other flotation devices required in existing reentry vehicles.

ORIGIN OF THE INVENTION

The invention described herein was made in the performance of work under a NASA Contract and is subject to the provisions of Section 305 of the National Aeronautics and Space Act of 1958, Public Law 85–568 (72 Stat. 435; 42 U.S.C. 2457).

BACKGROUND OF THE INVENTION

(1) Field of the invention

The present invention relates to space transportation. More particularly, the present invention relates to a space vehicle which may be employed in an emergency to safely transport men from an earth orbiting space station or the like to predetermined splashdown areas on earth or as a routine mode of data return from a space station.

(2) Brief description of the prior art

In prior space flights such as those in the Apollo, Gemini and Mercury projects, only a single all-purpose spacecraft has been employed to house and protect the astronauts both when they are launched into space and when they are returned to the earth. These prior art craft have been equipped with active attitude control, power and life support systems designed to be employed during the ascent, orbital loiter or travel and descent phases of a single mission of relatively short duration.

During the reentry and descent phases of any space flight, proper orientation of the craft is essential to protect the crew from extreme tumbling or oscillating movements and aerodynamic heating. For these purposes as well as others, conventional manned space capsules have been equipped with active control and propulsion systems which are automatically or manually activated to orient the craft into the proper reentry attitude and to maintain the proper orientation throughout the descent phase. These orientation control systems are complex, costly and not readily amenable to long term storage in orbit.

During the terminal portion of the descent phase in the conventional prior art vehicle, a parachute is deployed to slow the craft's rate of descent permitting it to drop safely onto the surface of a body of water. Once on the water's surface, the craft is designed to float in a position which prevents the entry hatch, radio antennas and lights from being submerged in the water. This flotation attitude has been difficult to maintain on manned spacecraft. For instance, the Apollo Command Module has two stable flotation attitudes. Uprighting devices are deployed in the event that the spacecraft pitches over into a "Stable II" or apex down position due to landing impact or wave action. This presents extreme crew discomfort and some hazards in that it is one more active system that is required to operate. This auxiliary equipment is also undesirable for use with an emergency craft where limited storage space and activating systems are available.

While the foregoing type of all-purpose craft has been extremely reliable and is well suitable for its intended function, it is not particularly suited for use as an emergency vehicle which can be stored in outer space for extended periods of as long as five years or more and still be capable of returning men to the earth on short notice. The control, power and life support systems of conventional manned spacecraft are designed for continual usage over a relatively short period of time after which they are no longer functional. It is, therefore, evident that extreme modification of such craft would be required before they could be suitably employed as emergency vehicles. It will also be evident that a spacecraft of the type previously described would have many systems, instruments, equipment and features which are neither desirable nor necessary for a stable emergency escape vehicle whose sole purpose is to return men to the earth from an orbiting space station.

SUMMARY OF THE INVENTION

The spacecraft of the present invention is adapted to safely return men or hard copy data cargo to predetermined splashdown areas from low earth orbit. The craft is designed for a pure ballistic reentry (no lifting) and to automatically orient itself to the heat shield forward attitude even in the event of a tail-first entry into the earth's atmosphere. The design characteristics which give the craft this single-point aerodynamic stability are also designed to give it flotation characteristics which cause the craft to float on the water's surface in an upright position and to return to this position even if it should be overturned during splashdown or by wave action. In one form, the spacecraft will accommodate and operate with one, two or three men. Ingress may be suited or unsuited. Provisions are made to remove suits after parent vehicle separation and before reentry. The crew is positioned with their backs to the heatshield so that the acceleration vector will be normal to the eyeheart line. A single-gas supply is employed for the craft's environmental control system, battery power supplies the electrical requirements, attitude control is performed manually and standard ring-sail parachutes are employed for terminal descent. The passive systems employed in the craft permit it to be stored on an earth orbiting station for periods of one to five years or longer.

The interactions among the mandatory requirements and constraining factors of the mission prescribe the external geometry of the emergency-escape vehicle. For example, the only practical way to meet the stability criteria is by placing the center of gravity (C.G.) toward the forward end or nose of the vehicle. However, the major component for C.G. determination is the crew or cargo envelope, which must be located near the center of the vehicle.

By the use of sphere-cone shapes for the fore and aft ends of the vehicle, the center of pressure and the metacenter can both be manipulated, and adequate room is available for equipment and crew location. Since the stability requirements for the forward and aft ends are opposites (that is, stable in one direction and unstable in the opposite direction), both ends can be optimized by making the shape of each end fit its own criteria. For forward stability, the C.G. must be below the metacenter; for backward instability, the aft metacenter must be behind the C.G. This procedure results in a combination of two dissimilar sphere-cones. Once the external configuration of the basic vehicle is selected, the subsystems may be selected and packaged within this configuration in an inerrant manner to maintain control of C.G. location.

These and other features and advantages of the invention will be more fully explained and understood by reference to the following specification and the related drawings and claims.

BRIEF DESCRIPTION OF THE DRAWINGS

FIGS. 1a-1e illustrate the sequence of events during the initial orientation of the craft of the present invention preliminary to retrofire, retrofire, retro-module ejection, chute deployment during terminal descent, and splashdown respecitvely;

FIG. 2 is a perspective view illustrating the craft of the present invention in greater detail;

FIG. 3 is a cross-sectional view illustrating the placement of the crew and equipment within the craft;

FIG. 4 is a sectional view taken along the line 4—4 of FIG. 3;

FIG. 5 is an overhead view, in section, illustrating an enlarged form of the craft of the present invention adapted to carry nine crew members;

FIG. 6 is an enlarged elevation partially in section illustrating details in the construction of the craft of the present invention;

FIG. 7 is a partially broken away view taken along the line 7—7 of FIG. 6, illustrating the retro-module of the present invention;

DESCRIPTION OF THE PREFERRED EMBODIMENTS

Figure 6A:
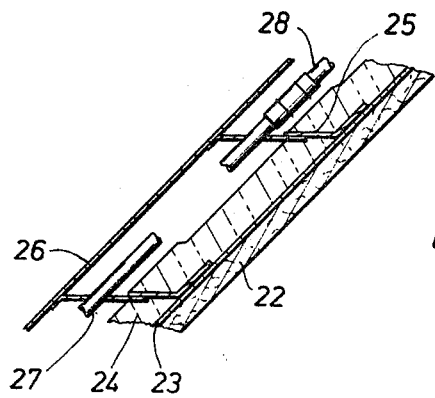
FIG. 6A is an enlarged view of the encircled area 6A on FIG. 6.

With reference to FIGS. 1a-1e and FIG. 2 of the drawings, the craft of the present invention includes a crew carrying capsule designated generally at 10 and a retropropulsion module 11 employed to orient and decelerate the craft. In the event of an emergency, the crew of an orbiting space station (not illustrated) will enter the craft 10, separate from the space station and orient the craft for earth reentry. The sequence of events following separation from the space station is illustrated sequentially in FIGS. 1a-1e. FIG. 1a illustrates the craft 10 in earth orbit, FIG. 1b illustrates retro propulsion which decelerates the craft to drop it out of orbit, FIG. 1c illustrates ejection of the retro module 11 which occurs immediately after the deceleration phase, FIG. 1d illustrates the terminal descent phase which employs a standard ring-sail chute 12, and FIG. 1e illustrates the craft 10 after splashdown floating on a water surface W.

Referring now to FIGS. 2 and 3, the craft 10 is constructed from two coaxially aligned, 40° and 30° right half-angle conical sections 13 and 14 respectively secured to each other along their bases to form a cylindrical center section 15 with the apex portion of each of the conical sections being truncated and replaced with a spherically curved dome surface. During reentry, section 13 is the forward surface of the craft and is equipped with an ablative heat shield which protects the craft 10 and its crew from the heat generated during the fall through the earth's atmosphere. The aft section 14 which is employed for crew entry and exit and for visual orientation is provided with an entry hatch 16 with a window 17 formed at the center of the hatch.

As best illustrated in FIGS. 6 and 7, the retro-module 11 is a unitized structure equipped with powering means for suitably orienting and decelerating the craft 10 to permit it to escape from its orbital trajectory. Since the craft is designed for emergency use, the powering means must be capable of rapid activation after extended periods of storage with little or no loss of energy. In a preferred form of the invention, the powering means for the module 11 may include six hydrazine monopropellant reaction control thrusters 18 and four solid propellant retrorocket motors 19. The thrusters 18 are preferably mounted in two diametrically opposed clusters of three to provide attitude control about the pitch, yaw and roll axis. The thrusters are laterally directed so that a single thruster is employed for pitch control, two thrusters are used simultaneously for yaw control, and two thrusters are used simultaneously for roll control.

The retrorocket motors 19 are fired sequentially with an approximate five second delay between each firing to provide the desired retro velocity. Each of the motors 19 is aligned to direct the thrust vector of the motor through the C.G. of the craft at a point $P_1$ equal to 50% of propellant depletion (FIG. 6). Thus, C.G. offset encountered during firing of the first two motors will be compensated by the cancelling forces exerted by the third and fourth motors. Point $P_2$ represents the C.G. of the craft at 100% propellant depletion.

With reference to FIGS. 2, 6 and 7, the retro-module 11 is releasably secured to the craft 10 by any suitable means such as metal retention straps 20. After proper orientation and deceleration of the craft, the retention straps 20 are released by activating explosive bolts 20a or the like secured to the upper ends of the straps 20. Once the straps 20 have been released, a suitable spring mechanism (not illustrated) pushes the module 11 away from the craft 10. The ejection of the module 11 is depicted schematically in FIG. 1c.

As may best be seen by reference to FIG. 6, the forward or leading section 13 is constructed in the form of a segment of a 40° half-angle cone while the aft section 14 is constructed in the form of a segment of a 30° half-angle cone. This mating "sphere-cone" configuration as well as the location of the C.G. with reference to the center of aerodynamic pressure of the craft give it single-point aerodynamic and hydrodynamic stability. Thus, if the aft section 14 is leading as the craft begins to reenter the earth's atmosphere, the design of the craft causes it to automatically right itself with the heat shield or leading section 13 disposed forwardly. Similarly, because of these same characteristics, if the craft should be tripped on its side during splashdown or by wave action, the single-point flotation stability will also cause it to right itself automatically, thus keeping the aft end 14 and the hatch 16 above water. The sphere-cone configuration is also designed to maintain water impact loads within tolerable values while simultaneously providing the desired aerodynamic and hydrodynamic characteristics.

To maintain the required single point aerodynamic and hydrodynamic stability, the men and equipment are positioned within the craft 10 to place its center-of-gravity along the central axis of heat shield section 13 as near as possible to the section's spherical end. As illustrated in FIGS. 3 and 4, the interior of the craft 10 includes suitable couch support means (not illustrated) for the crewmen C who are positioned with their backs to the spherical end of section 13. In the three-man craft illustrated in FIGS. 3 and 4, the crewmen C are seated side-by-side with the largest part of their mass being positioned within the section 13. The middle crewman is seated slightly to the rear of the other crewmen to move the center-of-gravity of the craft as close to the spherical end of the section 13 as practical and to provide increased lateral spacing between the crewmen. The majority of the life support, power and control equipment indicated generally at E is also positioned within the section 13 to maintain the craft's C.G. as far forward as possible. FIG. 5 illustrates a preferred distribtuion of crewmen for proper positioning of the C.G. in a nine man craft 110.

FIG. 6A illustrates details of an exemplary construction for the heat shielded end 13 of the craft 10 or 110. The outer surface of the section is provided with a layer of ablative material 22 such as a moderate shear silicone elastomer in a fibreglas honeycomb reinforcement which is designed to dissipate the heat generated upon reentry of the craft 10 into the earth's atmosphere. The layer 22 is bonded or otherwise suitably secured to a thin metal skin 23 of aluminum or other suitable, light-weight material which forms the outer covering or shell of the craft. A heat insulative material 24 is disposed behind the skin 23 and acts to protect the crew from temperature extremes both before and after reentry. Mounting rings 25 of aluminum or other suitable material are spot welded or otherwise secured between the outer skin 23 and an inner skin 26 constructed of thin aluminum sheeting or other suitable material. Plumbing lines 27 and electrical wiring 28 employed in the power, life support and control systems of the craft 10 are mounted within the rings 25 and are protected by the skin 26 from inadvertent damage by crew and equipment movements.

The aft end 14 of the craft 10 is preferably a light-weight structure which may have the same construction as the heat shield end 13 but without the layer of ablative material. The section 14 houses the main parachute 12, and various other equipment which has not been illustrated such as a drogue parachute, antennas, orbiting beacon, environmental control system overboard vents and electrical disconnects to the orbiting space station and retro-module 11. The dome area of the section 14 forms the entry hatch 16 with the window 17 provided in the hatch being used for visual earth reference in the damping of initial vehicle separation rates.

Environmental control of the craft 10 while it is orbital and during reentry prior to splashdown, is preferably effected by means of a closed loop system which may consist of a lithium hydroxide/charcoal purification system with the cabin atmosphere being cooled in a water boiler and recirculated through the cabin by a suitable compressor. In the interest of weight reduction and simplification, the environmental control system of the craft is preferably not adapted to be employed with pressure suits. For this reason, pressure suits worn by the astronauts are removed after the environmental control system is activated and the cabin has been purged with a life supporting atmosphere. Entry into the craft 10 by a fully suited astronaut requires a minimum hatch diameter opening of approximately 40 inches. Once in the craft, sufficient room is required to permit removal of the suit. Based on the hatch size limitation and internal capacity requirements and also because of the need to prevent air flow attachment and reattachment to the aft cone surfaces, the aft cone is preferably formed with a minimum cone angle of 30°.

In an exemplary application of the emergency earth orbital escape device 10 of the present invention, the hatch of the craft may be secured to the orbiting space station with a suitable pressure tight connecting passage extending between the station and the craft. In the event of emergency conditions, the crew may enter the craft 10 through a pressure tight passage, close the hatch 16, activate the environmental control system and remove their suits. The explosive bolts or other releasable means securing the craft 10 to the station may then be activated to separate the two ships.

In one embodiment of the craft 10 sized for a three-man escape mission, the central axis of the craft measures approximately 99.4 inches fore to aft and the cylindrical center section 15 has a diameter of approximately 100 inches. With reference to FIG. 6, the spherical portion of the forward end 13 has a radius $R_1$ of approximately 35 inches and the aft spherical portion is designed with a radius $R_2$ of approximately 26.5 inches. The conical portion of the aft end is in the form of a 30° half-angle, right cone and the corresponding portion of the forward end is a 40° half-angle, right cone.

Figure 8:
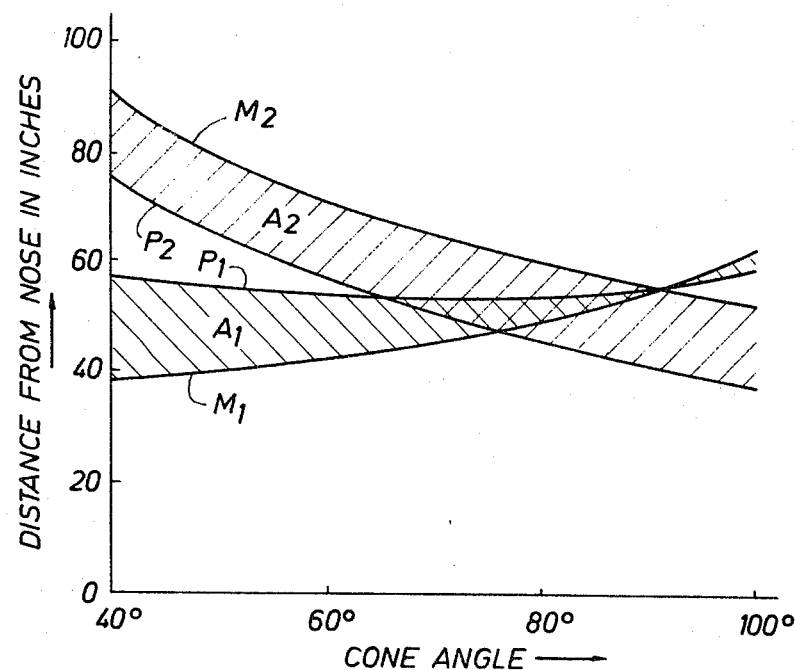
FIG. 8 is a graph showing configuration stability criteria.

Configuration stability criterion for the basic sphere-cone configuration described herein is illustrated in FIG. 8 where two sets of curves $P_1$, $M_1$ and $P_2$, $M_2$ are drawn to represent center of pressure (P) and metacenter (M) respectively. The curves depict C.G. location limits which meet the forward stability and aft instability requirements for the craft of the present invention. The horizontal axis of the graph of FIG. 8 represents full cone angle of the craft sections in degrees while the vertical axis represents distance from the forward end 13 of the craft 10. The area $A_1$ between curves $P_1$ and $M_1$ illustrates the limit of C.G. location that will ensure positive forward aerodynamic and hydrodynamic stability. The area $A_2$ between curves $P_2$ and $M_2$ illustrates the C.G. limit that will ensure backward (inverted) stability. It may be noted that the optimum crossover point is close to the 40° half-angle cone configuration (80° full cone angle) employed for the forward end of the craft 10.

Figure 9:
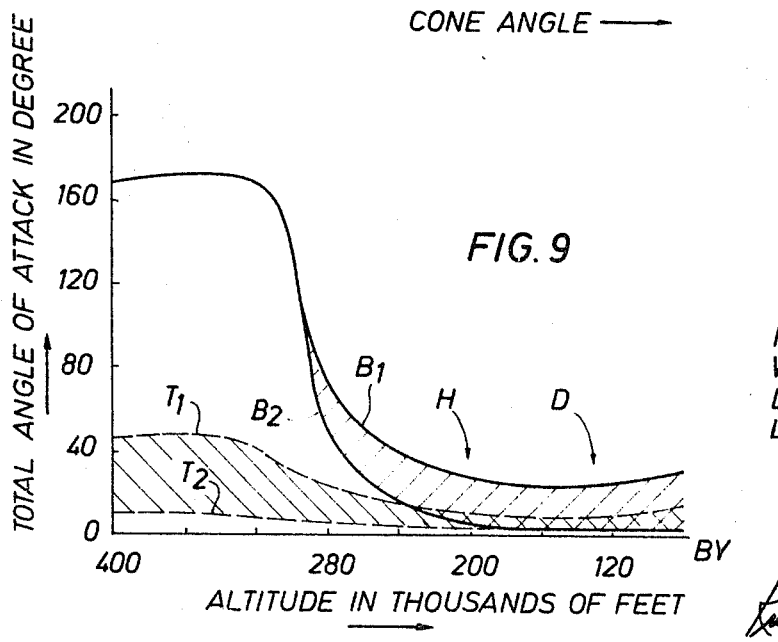
FIG. 9 is a graph showing angle-of-attack convergence.

FIG. 9 illustrates the angle-of-attack convergence for the design trajectory and for the extreme case of backward reentry from 400,000 feet down to drogue chute deployment at 80,000 feet. Curves $B_1$ and $B_2$ represent backward entry while curves $T_1$ and $T_2$ represent design trajectory. The graph assumes a 300-nautical mile circular orbit, 600 ft./sec. $\Delta V$ and a 15° retrofire angle. The horizontal axis represents altitude in thousands of feet while the vertical axis represents total angle of attack in degrees. Point H represents maximum heating rate which occurs at approximately 200,000 feet while point D represents maximum dynamic pressure which occurs at approximately 130,000 feet. In the graph of FIG. 9, the initial angle of attack was assumed to be 180° with a spin rate of 3 r.p.m. imparted to the vehicle to ensure that the backward attitude was held until the atmosphere became effective (at approximately 300,000 feet). The angle-of-attack excursion reduces to 31° by the time of the 80,000 foot drogue deployment as shown in FIG. 9. The maximum oscillatory acceleration on the brain at maximum $g$ is $9.0 \pm 1.7$ $g$ in the "eyeballs in" direction. The maximum acceleration in the other two directions at the brain is $\pm 2$ $g$. The frequency is less than 1.3 c.p.s. These accelerations are well within human tolerance.

The foregoing disclosure and description of the invention is illustrative and explanatory thereof, and various changes in the size, shape and materials as well as in the details of the illustrated construction may be made within the scope of the appended claims without departing from the spirit of the invention. Thus, by way of example rather than limitation it will be understood by those having ordinary skill in the art that the craft of the present invention may be modified to act as a manned or unmanned data return vehicle. It will also be understood that while the emergency usage of the craft has been emphasized, the ship design is well suited for various non-emergency manned missions and in many applications may be superior to conventional space craft configurations.

What is claimed is:

1. A single-point, aerodynamically and hydrodynamically stable craft for use in returning men, data or cargo from space to the earth's surface comprising a capsule having a leading end and an aft end with said leading end including an external surface in the shape of a section of a truncated right cone having a spherically curved apex portion and said aft end including an external surface in the shape of a truncated right cone having a spherically curved apex portion, the angle of the cone of the leading end being dissimilar from the angle of the cone of the aft end, the bases of the two ends being mated together to form a clean sharp line, the craft in entry flight having a center of gravity which is forward of the center of pressure of the leading end and an aft center of pressure which is behind the center of gravity, the craft in upright floatation having a center of gravity which is below the metacenter of the leading end and if the aft end of the craft turns into the water the metacenter of the aft end being below the center of gravity, whereby the craft is aerodynamically and hydrodynamically stable in one direction and unstable in the opposite direction.

2. The craft as defined in claim 1 further including propulsion power means for orienting and propelling said craft.

3. The craft as defined in claim 2 wherein said propulsion power means includes a releasable retro-module having solid fuel retrorocket propulsion motors and control thrusters for respectively altering the craft's velocity and for orienting the craft for earth reentry.

4. The craft as defined in claim 3 wherein said leading end cone section is approximately that of a 40° half-angle cone and said aft end cone section is approximately that of a 30° half-angle cone.

5. The craft as defined in claim 4 further including heat shield means disposed about said leading end for dissipating heat generated by the craft as it falls through the earth's atmosphere.

6. The craft as defined in claim 5 wherein said aft end includes hatch entry means for permitting men to enter and leave said capsule.

7. The craft as defined in claim 6 wherein said propulsion means includes long storage life fuel means.

8. The craft as defined in claim 1 wherein said leading end cone section is approximately that of a 40° half-angle cone and said aft end cone section is approximately that of a 30° half-angle cone.

9. The craft as defined in claim 1 further including heat shield means disposed about said leading end for dissipating heat generated by the craft as it falls through the earth's atmosphere.

10. The craft as defined in claim 1 further including propulsion power means for orienting and propelling said craft.

11. The craft as designated in claim 1 wherein the full cone angle of the end sections and the location of the center of gravity from the nose is in accordance wtih the curves set forth in FIG. 8.

References Cited
UNITED STATES PATENTS

| | | | |
|---|---|---|---|
| 2,951,659 | 9/1960 | Yoler | 244—3.22 |
| 3,270,908 | 9/1966 | Faget et al. | 244—1(SS)X |
| 3,276,722 | 10/1966 | Eggers, Jr. et al. | 244—1(S.S.) |
| 3,311,323 | 3/1967 | Cappel | 244—1(S.S.) |
| 3,416,750 | 12/1968 | Young | 244—1(S.S.) |
| 3,511,453 | 5/1970 | Girogosian | 244—1(S.S.) |

MILTON BUCHLER, Primary Examiner

J. L. FORMAN, Assistant Examiner

U.S. Cl. X.R.

244—1 SC